(12) United States Patent
Feuilloley et al.

(10) Patent No.: US 11,090,856 B2
(45) Date of Patent: Aug. 17, 2021

(54) METHOD FOR THE PREFERENTIAL HEATING OF A HOLLOW BODY COMPRISING A MARKING STEP

(71) Applicant: SIDEL PARTICIPATIONS, Octeville-sur-Mer (FR)

(72) Inventors: Guy Feuilloley, Octeville-sur-mer (FR); Cédric Bianchini, Octeville-sur-mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 332 days.

(21) Appl. No.: 16/083,532

(22) PCT Filed: Mar. 29, 2017

(86) PCT No.: PCT/FR2017/050717
§ 371 (c)(1),
(2) Date: Sep. 10, 2018

(87) PCT Pub. No.: WO2017/174898
PCT Pub. Date: Oct. 12, 2017

(65) Prior Publication Data
US 2019/0070771 A1   Mar. 7, 2019

(30) Foreign Application Priority Data
Apr. 5, 2016 (FR) ...................... 1652950

(51) Int. Cl.
*B29C 49/64* (2006.01)
*B29L 31/00* (2006.01)
(Continued)

(52) U.S. Cl.
CPC .......... *B29C 49/6436* (2013.01); *B29C 49/06* (2013.01); *B29K 2067/003* (2013.01); *B29L 2031/7158* (2013.01)

(58) Field of Classification Search
None
See application file for complete search history.

(56) References Cited

U.S. PATENT DOCUMENTS

| 5,681,521 A | 10/1997 | Emmer et al. |
| 9,296,148 B2 * | 3/2016 | Feuilloley ........... B29C 49/6436 |

(Continued)

FOREIGN PATENT DOCUMENTS

| DE | 100 00 859 A1 | 10/2000 |
| FR | 2 703 944 A1 | 10/1994 |
| FR | 3 001 912 A1 | 8/2014 |

OTHER PUBLICATIONS

International Search Report, dated Jul. 5, 2017, from corresponding PCT/FR2017/050717 application.

*Primary Examiner* — Monica A Huson (57) ABSTRACT

Disclosed is a method for the preferential heating of a thermoplastic hollow body having at least one portion to be heated and another to be superheated, the portion that is to be superheated initially having a radiation absorption coefficient substantially identical to that of the portion to be heated. The method includes, in succession: a first step of marking the portions of the hollow body that are to be superheated, during which step isolated marks are made in the thickness of the wall of the portion that is to be superheated so as to increase its absorption coefficient; a second step of preferential heating of the hollow body by uniform exposure of the portions that are to be heated and of the portions that are to be superheated to the heating electromagnetic radiation. Also disclosed is a preform marked in accordance with the first step of the method.

20 Claims, 2 Drawing Sheets

(51) Int. Cl.
   *B29K 67/00*     (2006.01)
   *B29C 49/06*     (2006.01)

(56) References Cited

U.S. PATENT DOCUMENTS

| | | | |
|---|---|---|---|
| 2008/0099961 A1* | 5/2008 | Feuilloley | B29B 13/024 |
| | | | 264/405 |
| 2010/0104697 A1 | 4/2010 | Kriegel et al. | |
| 2013/0193622 A1* | 8/2013 | Feuilloley | B29C 49/6436 |
| | | | 264/458 |
| 2015/0352772 A1 | 12/2015 | Feuillouley et al. | |

* cited by examiner

METHOD FOR THE PREFERENTIAL HEATING OF A HOLLOW BODY COMPRISING A MARKING STEP

TECHNICAL FIELD OF THE INVENTION

The invention relates to a method for preferential heating of a hollow body that is made of thermoplastic material, such as a preform, with the method comprising a step for heating the hollow body beyond a glass transition temperature by a heating radiation, at least one portion that is to be heated of the hollow body being designed to be heated to a first heating temperature while at least one other portion that is to be superheated of the hollow body is designed to be heated beyond the first heating temperature, with the portion that is to be superheated initially having an absorption coefficient of the radiation that is essentially identical to that of the portion that is to be heated.

TECHNICAL BACKGROUND OF THE INVENTION

The preforms that are made of thermoplastic material are in general obtained by injection molding in a mold during an initial manufacturing step. However, there are other methods for manufacturing preforms, such as, for example, compression molding or injection compression molding.

The preforms in general have an essentially rotating cylindrical body with a thick tubular wall, which is closed at one of its axial ends by a bottom with a thick wall, and which is extended at its other end by a neck, itself also tubular. The neck is given its final shape and dimensions, while the preheated body of the preform is designed to undergo a relatively significant deformation to shape it into a container during a forming step.

During an intermediate heating step, the body of the preform is made malleable by heating beyond a glass transition temperature.

Then, during the forming step, the thus heated preform is placed in a mold that has a molding impression in accordance with the container that is to be obtained. A pressurized fluid, such as air, is then injected into the malleable body of the preform so as to flatten its wall against the impression of the mold.

Traditionally, the body of the preform is heated in such a way that it undergoes an expansion that is the most homogeneous possible in all of the radial directions.

The mold is in general kept at a temperature that is cold relative to that of the preform. Thus, when the wall material of the preform enters into contact with the mold, it is abruptly cooled in such a way as to be set in a semi-crystalline state.

This cooling phenomenon makes it difficult to produce containers, in particular bottles, having a cross-section that is not approximately rotationally symmetrical in relation to the axis of the neck from the preform. This leads to numerous drawbacks that are cited in the document FR-A1-2,703,944.

These are, for example, containers with polygonal cross-sections in which each approximately flat face is separated by some distance from a cylindrical surface that envelops the edges, or containers with flattened bodies such as bottles for detergent products.

A method has already been proposed, in particular in said document FR-A1-2,703,944, for obtaining a container with a cross-section that is not rotationally symmetrical and with a wall of homogeneous thickness obtained by blow molding or stretch blow molding.

This document proposes in particular to heat certain portions, so-called portions that are "to be superheated," of the body of the preform to a temperature that exceeds the glass transition temperature, without, however, reaching the crystallization temperature of the material. The other portions, so-called portions that are "to be heated," of the preform are heated beyond the glass transition temperature but to a lower temperature than the portions that are to be superheated.

Such a method, commonly called "preferential heating method," makes it possible to impart to the portions that are to be superheated mechanical characteristics that make possible a stretching, in particular circumferential, which is faster in relation to the portions that are to be heated.

The shape and the distribution of the portions that are to be superheated and the portions that are to be heated define a heating profile of the preform. The heating profile is adapted based on the shape of the final container that is to be obtained.

When the pressurized fluid is injected into the body of the preform, the superheated portions are stretched more quickly than the heated portions under the effect of the pressure of the fluid. Thus, at the time when the superheated portions enter into contact with the mold, they have a slighter thickness than that of the heated portions. The superheated portions are then cooled and set in their state, making it possible to stretch the rest of the body of the preform gradually until it adapts to the impression of the mold.

By adjusting the temperature of each portion, this makes it possible to obtain a final container whose body has a wall of essentially constant thickness.

Of course, to obtain a satisfactory container, it is necessary to index the angular position around its main axis in relation to the mold so as to orient correctly the superheated portions toward the corresponding portions of the impression of the mold.

However, the implementation of the method disclosed in this document calls for a furnace that is equipped with means for restricting the heating of the distal portions. These are, for example, shields for protecting the portions that are to be heated from heating radiation, or else means for temporarily disengaging the revolution of the preforms. Such means are very expensive to manufacture.

In addition, it is very difficult to adjust the furnace to obtain precise heating profiles based on the shape of the container that is to be obtained.

It has already been proposed to manufacture preforms whose portions that are to be superheated are coated with a layer of colored material and/or loaded with additives so as to increase the absorption coefficient of the heating radiation of the portion that is to be superheated.

Nevertheless, such an operation for selective coating of certain areas is complicated to carry out.

In addition, for certain applications, the presence of an additional layer is not desired, for example for reasons of hygiene.

In addition, the presence of this layer, in particular when it is colored, very appreciably alters the appearance of the container that is obtained after forming.

In this connection, it has also been proposed to modify the surface state of the outside faces of the portions of the wall that is to be superheated, for example by mechanically creating a frosted or sandy appearance.

Nevertheless, for certain applications, the presence of a rough area is not desired, for example for reasons of hygiene.

In addition, the presence of this rough area very appreciably alters the appearance of the container that is obtained after forming.

BRIEF SUMMARY OF THE INVENTION

The invention proposes a preferential heating method of the type described above, characterized in that it comprises in succession:

A first step, for marking at least one portion that is to be superheated of the hollow body, during which point marks are made in the thickness of the wall of said at least one portion that is to be superheated in such a way as to increase the absorption coefficient of said portion that is to be superheated in relation to the absorption coefficient of the portion that is to be heated;

A second step, for heating the hollow body, during which each portion that is to be heated and each portion that is to be superheated are exposed to the heating electromagnetic radiation.

According to other characteristics of the method that is carried out according to the teachings of the invention:

During the first marking step, point marks are made in the thickness of the wall of at least one portion that is to be superheated, excluding faces that delimit the wall;

During the second heating step, said at least one portion that is to be heated and said at least one portion that is to be superheated are exposed uniformly to the heating electromagnetic radiation;

The density of the point marks on each elementary part of a portion that is to be superheated is determined based on the heating temperature that is to be reached at the end of the second heating step for said elementary part;

Each point mark is made by point modification of the opacity with respect to the radiation of the material that constitutes the wall that is made of thermoplastic material of the hollow body;

Each point mark is made by means of a laser that emits a laser beam;

Each point mark is made by local heating of the material in the thickness of the wall by means of the laser;

The thermoplastic material is formed by "PET," and the laser beam has a wavelength of between 400 nm and 3,000 nm;

The laser beam has a wavelength in the short infrared, in particular 1,064 nm;

The laser emits a laser beam in pulses between $10^{-10}$ and $10^{-7}$ seconds, in particular on the order of a nanosecond;

The laser is adjusted so that a focal point of the laser beam that is emitted is arranged at a distance from the faces that delimit the wall to be marked that exceeds a determined threshold, below which the face of the wall is damaged;

The focal point of the laser beam is located in the thickness of the wall to be marked;

The focal point of the laser beam is located outside of the wall to be marked;

The method comprises a third step, for controlling the marking means, during which the temperature of at least one portion that is to be superheated is set, and then it is compared to a setpoint temperature, with the density of the point marks being modified in the first marking step in such a way as to approach the setpoint temperature for the next preforms.

The invention also relates to a marked preform that is obtained according to the first marking step of the method that is carried out according to the teachings of the invention, with the preform being made by molding a single thermoplastic material, characterized in that the wall of the preform comprises at least one portion that is to be superheated comprising, in the thickness of the wall made of thermoplastic material, point marks formed by local opacification of the thermoplastic material.

According to other characteristics of the marked preform:

The point marks are distributed in at least one portion that is to be superheated according to organized patterns;

At least one portion of the wall that is to be superheated has a surface state that is similar to other wall portions that are to be heated;

The preform is made of polyethylene terephthalate.

BRIEF DESCRIPTION OF THE FIGURES

Other characteristics and advantages of the invention will emerge during the reading of the detailed description that will follow for the understanding of which reference will be made to the accompanying drawings in which.

DETAILED DESCRIPTION OF THE FIGURES

In the description below, elements that have an identical structure or analogous functions will be referred to by the same reference number.

In the description below, the following orientations will be adopted in a non-limiting manner:

Longitudinal, directed from the back to the front and referred to by the arrow "L" of the figures;

Vertical, directed from the bottom to the top and referred to by the arrow "V" of the figures;

Transverse, directed from left to right and referred to by the arrow "T" of the figures.

Figure 1:
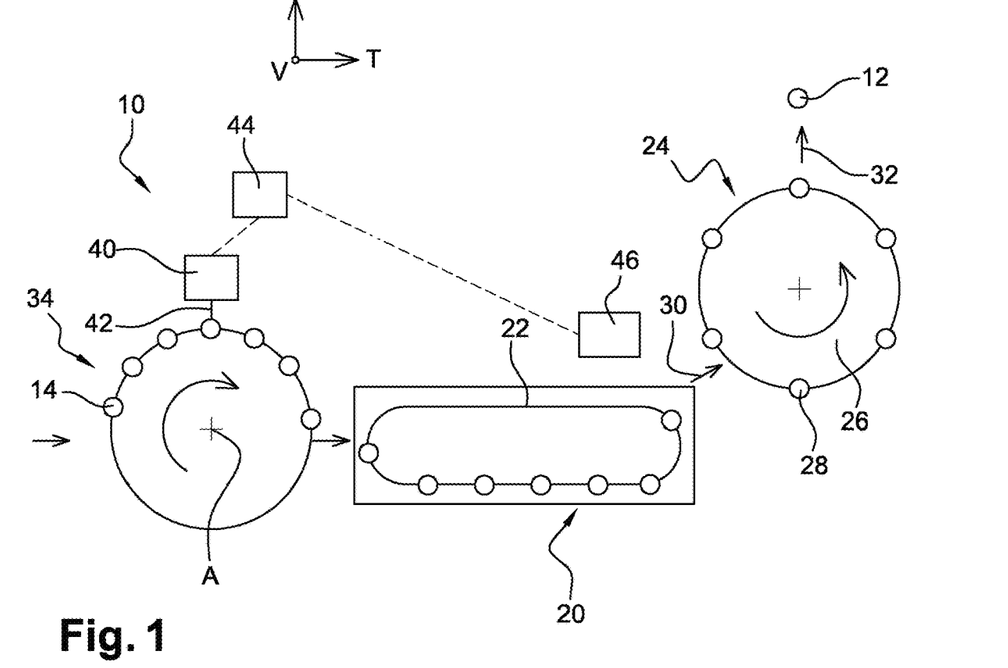
FIG. 1 is a top view that diagrammatically shows a facility for manufacturing marked containers for implementing the method according to the invention.

Shown diagrammatically in FIG. 1 is a facility 10 for mass production of containers 12 made of thermoplastic material. Here, in a non-limiting manner, the containers 12 are bottles. The thermoplastic material is formed here by polyethylene terephthalate, referred to below under its acronym "PET."

In the description below and in the claims, the preforms 14 and the containers 12 will be referred to in a generic manner by the term "hollow body."

The containers 12 are obtained by hot-forming of preforms 14 made of thermoplastic material.

Below, the term "preform 14" will be used for referring to the container before the forming step.

Such preforms 14 are obtained in general by injection molding. The invention also relates to preforms that are obtained by other molding methods such as compression molding or injection compression molding.

Figure 3:
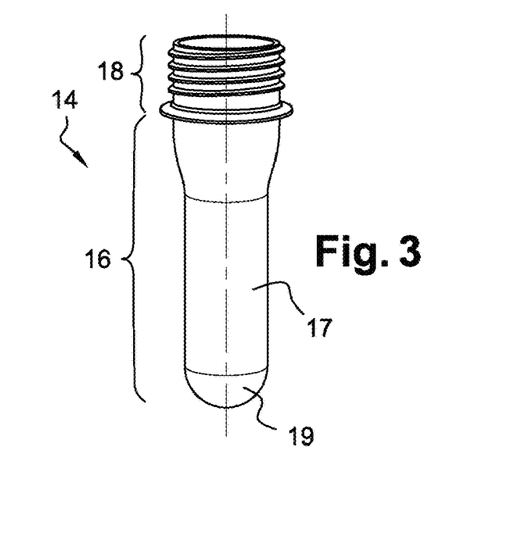
FIG. 3 is a perspective view that shows a preform before its marking.
Figure 4:
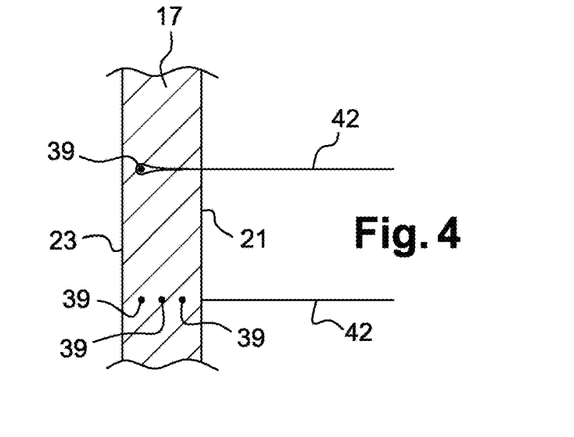
FIG. 4 is an axial cutaway view of a portion of the wall of the body of the preform of FIG. 3 during its marking.

As shown in FIG. 3, they have a cylindrical body 16 with a tubular wall 17, closed at one of its axial ends by a bottom 19, and which is extended at its other end by a neck 18, itself also tubular. The wall 17 is delimited by an outer face 21 and by an inner face 23 as is illustrated in FIG. 4. The neck 18 is in general injected in such a way as to already have its final shape while the body 16 of the preform 14 is designed to undergo a relatively significant deformation for forming the final container 12 during a forming step. The preforms 14 are produced here, coming from material made of PET, i.e., the preform 14 is made by molding a single thermoplastic material of determined composition.

In referring to FIG. 1, the facility 10 comprises a station 20 for heating preforms 14. By way of non-limiting example, the heating station 20 is formed by a tunnel in which heating means (not shown) that emit a heating electromagnetic radiation are arranged.

The heating means are formed by, for example, heating electromagnetic-radiation emitters such as infrared lamps that emit an infrared radiation.

A means 22 for conveying preforms 14 is arranged in such a way as to make the preforms 14 travel along heating means from an intake to an outlet of the tunnel. The direction of travel of the hollow bodies is indicated by the arrows of FIG. 1.

As a variant, the heating station is formed by individual cavities that are equipped with heating means and that each receive a preform.

At their exit from the heating station 20, the part that is to be deformed of the preforms 14, in general the body 16, is made malleable by heating beyond a glass transition temperature, while the parts that are not to be deformed, in general the neck 18, are kept at a temperature that is low enough to maintain their original shape.

The facility 10 also comprises a station 24 for forming preforms 14 that are thus heated. The forming station 24 is arranged downstream from the heating station 20 with reference to the stream of preforms 14 in the facility 10.

The forming station 24 here has the shape of a carousel 26 that carries a number of forming stations 28. Each forming station 28 is thus able to move around the axis of the carousel 26 between a point 30 for loading hot preforms 14 and a point 32 for unloading final containers 12 before resuming a new cycle.

Here, these are stations 28 for forming by stretch-blow molding of the preforms 14, known in the art and which will therefore not be illustrated in greater detail.

For this purpose, each forming station 28 comprises a removable mold (not shown) that delimits a molding cavity. The molding cavity is designed to receive a preform 14 that exits still hot from the heating station 20. Each forming station 28 also comprises a nozzle (not shown) associated with blow molding or stretch blow molding that is designed to impart its final shape to the container 12 by flattening the wall 17, made malleable by the heating means, of the preform 14 against the walls of the molding cavity by injecting a pressurized fluid through the neck 18 of the preform 14. The malleable wall 17 of the preform 14 thus undergoes stretching that decreases its thickness.

Concerning stations 28 for forming by blow molding, the fluid is in general formed by a pressurized gas.

It will be understood, however, that the invention can also be applied to other types of forming stations, in particular to stations for forming by injecting a pressurized liquid into the preform.

During the step for forming containers 12, the carousel 26 is driven by a rotational movement to make it possible to move hot preforms 14 from the loading point 30 to the unloading point 32 of the formed containers 12. Thus, a new preform 14 can begin the forming step while the preceding preform 14 has not yet completed its forming cycle. This makes it possible to maintain a fast pace for mass production of containers 12.

The facility 10 also comprises a station 34 for marking preforms 14. The marking station 34 is arranged upstream from the heating station 20 with reference to the stream of preforms 14 indicated by the arrows of FIG. 1, in such a way that the preforms 14 are heated after their marking.

As a variant, the marking station is arranged downstream from the device for molding preforms.

According to another variant, the marking station is integrated with the heating station. In this case, the marking station takes, for example, the place of a heating means at the intake of the heating station, or else the marking station is arranged in an area without heating means in the tunnel, for example in a bend of the heating tunnel.

This marking station 34 has as its function to increase the absorption coefficient of certain portions 35 that are to be superheated of the body 16 of the preform 14. These portions 35 that are to be superheated comprise point marks 39 that make it possible to increase the absorption coefficient of the heating radiation in relation to that of the portions 37 that are to be heated and that are without said point marks 39.

Figure 2:
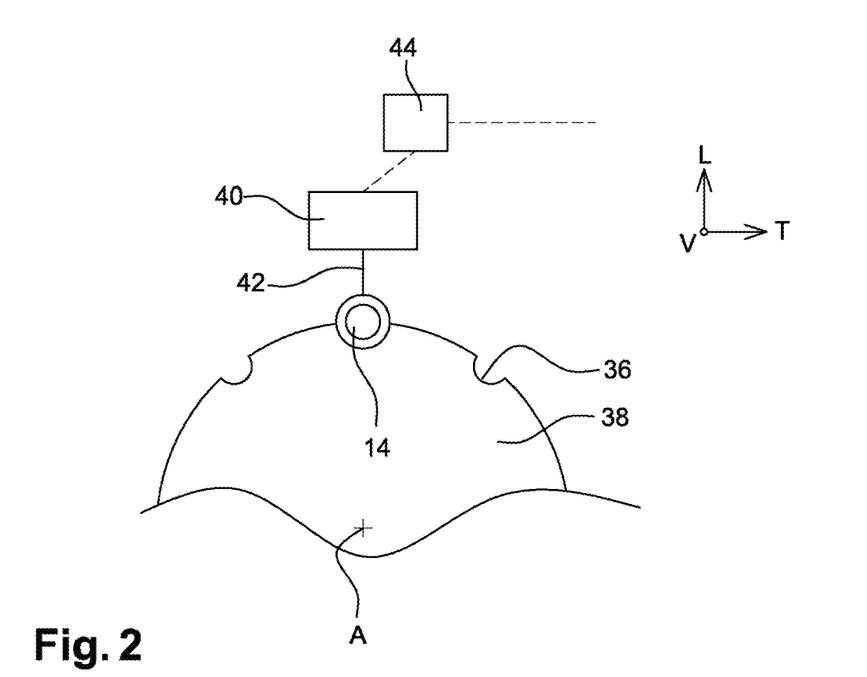
FIG. 2 is a top view that shows a marking station of the facility of FIG. 1.

As illustrated in FIG. 2, the marking station 34 comprises a support element 36 for the preform 14; these are, for example, slots located on the periphery of a transfer wheel 38 mounted to rotate around a vertical axis "A."

As a variant, not shown, the support element for the preform is formed by a clamp or else by a mandrel on which is fitted the neck of the preform that is rotated on the periphery of the transfer wheel.

The marking station 34 also comprises means that can be parameterized for marking the wall 17 of the preform 14. These means thus make it possible to inscribe point marks 39 in the thickness of the wall 17 of the preform 14, as is shown in FIG. 4.

Preferably, the point marks 39 are formed between the outer face 21 and the inner face 23, excluding said outer face 21 and said inner face 23.

Concerning preforms 14 made of a transparent or at the very least translucent thermoplastic material, the marking means here make it possible to modify locally the opacity in the heating radiation of the material that constitutes the wall 17 that is made of thermoplastic material of the preform 14.

This makes it possible to increase the absorption coefficient of portions 35 that are to be superheated of the preform 14.

Preferably, the marking means do not remove material in the wall 17 of the preform 14. In addition, the outer face 21 and the inner face 23 of the wall 17 are left unchanged by the marking step of the wall 17. Thus, the wall 17 of the container 12 that is obtained after forming has a homogeneous thickness, including in the marked area. The wall 17 of the container 12 is thus as resistant to the break in its marked part as in its unmarked parts. In addition, this makes it possible to mark preforms 14 that are designed to become containers 12 with a very fine wall 17.

In the example that is shown in FIGS. 1 and 2, the marking means comprise a laser 40. It is more particularly a laser 40 that is able to emit a laser beam 42. The beam 42 is emitted essentially orthogonally to the outer face 21 of the wall 17.

The beam 42 has a power that is below an ablation threshold beyond which the laser 40 begins to hollow out the wall 17. In any case, it is preferable that the laser 40 be adjusted in such a way that the instantaneous power of the emitted beam 42 does not go beyond the ablation threshold so as to prevent the wall 17 from being engraved.

The laser 40 more particularly emits a beam 42 in pulses of between $10^{-10}$ and $10^{-7}$ seconds. Each beam pulse 42 thus lasts on the order of a nanosecond.

It was actually noted that when applied to a preform 14 made of PET, a beam 42 that is emitted in pulses lasting more than 1 microsecond would bring about excessive heating of the thermoplastic material, causing the destruction of the material. It was also noted that when applied to a preform 14 that is made of PET, a beam 42 that is emitted in pulses on the order of a femtosecond would not make it possible to ensure sufficient marking to increase the absorption coefficient of the heating radiation through the wall 17 of the preform 14.

The laser 40 is preferably selected in such a way as to emit a beam 42 whose radiation is poorly absorbed by the material that forms the preform 14 in such a way as to deposit little energy at the outer face 21 or the inner face 23 of the wall 17. Such a laser 40 is selected based on the wavelength of the beam 42. Actually, if the energy of the beam 42 was absorbed on the surface of the wall, the outer face 21 of the wall 17 would be damaged. This parameter is easily determined by one skilled in the art during tests.

For example, for a wall 17 that is made of PET, it was noted that the beam 42 advantageously has a wavelength of between 400 nm and 3,000 nm, for example 532 nm or 1,064 nm.

Furthermore, in a known way, a laser beam 42 is not perfectly cylindrical in shape all along its path. The laser beam 42 first converges to a point called a focal point, and then the laser beam 42 continues its path by diverging from the focal point. Thus, the focal point is determined as being the point at which the beam 42 has its smallest cross-section.

It was noted that to produce point marks 39 in the thickness of the wall 17 without damaging its outer face 21 or its inner face 23, the focal point is preferably arranged at a greater distance to a determined threshold of said outer face 21 and said inner face 23. The threshold is determined by, for example, tests. This threshold is very low; it is, for example, less than the half-thickness of the wall 17. Thus, to produce point marks 39 without damaging the outer face 21 and the inner face 23 of the wall 17, the focal point can be located either inside the wall 17 or outside the wall 17.

To adjust the position of the focal point precisely, for example, a defocusing lens that is inserted on the path of the beam 42 between the laser 40 and the preform 14 is used.

Several types of lasers can be selected to meet these conditions.

By way of non-limiting example, here, this is a laser 40 with neodymium-doped yttrium-aluminum garnet, better known under the name "Nd-YAG laser." Such a laser 40 typically emits a beam 42 in the short infrared range, in particular with a wavelength of 1,064 nm. An example of such a laser 40 is marketed in particular by the "TRUMPF" Company under the name "TruMark 6000."

According to other non-limiting examples, it will also be possible to use a neodymium-doped yttrium orthovanadate-type laser, also known under the name "Nd-YVO$_4$ laser," or else an ytterbium-fiber-type laser, also known under the name "Yb:fiber laser."

It was noted that the areas of the wall 17 that is made of thermoplastic material targeted by the laser beam 42 have, in their thickness, the appearance of at least one point mark 39 on the path of the laser beam 42, as is shown by the beam 42 at the top of FIG. 4.

As a variant, a string of multiple point marks 39 is able to be formed in the thickness of the wall 17 on the path of the laser beam 42, as is shown by the beam 42 at the bottom of FIG. 4.

The two laser beams 42 of FIG. 4 are oriented here essentially orthogonally to the outer face 21 of the wall 17.

Each point mark 39 is formed by a local rise in the temperature in the thermoplastic material under the action of the laser beam 42. Each point mark 39 is thus made in the body, starting from the material that constitutes the preform 14. Although the phenomenon is not totally explained, it was noted that this local rise in temperature leads to a modification of the chemical properties and/or the structure of the material that is reflected by a modification of the optical properties of the material that is located at this point mark 39. More particularly, this point mark 39 has a greater opacity to the heating radiation than the thermoplastic material that is not modified by the beam 42.

Such a point mark 39 can easily be characterized by a particle that is obtained from an additive that is added to the thermoplastic material before the molding of the preform 14.

By way of non-limiting example, if the rise in temperature is adequate, it is possible to observe the appearance of carbon particles in the point mark 39 obtained from the heating of the thermoplastic material that forms the wall 17.

Nevertheless, the point mark 39 can have a greater opacity without containing carbon particles.

The laser 40 comprises means (not shown) that are controlled to move the emitted beam 42 in a determined marking field, for example by means of lenses and/or mirrors that are movable in relation to the support elements 36. Thus, the support element 36 makes it possible to route the preform 14 into a marking position that is located in the field for marking the laser 40. The preform 14 is then immobilized or rotated around its axis, in a continuous or intermittent manner, during the time that the laser beam 42 traces the point marks 39 in the stationary wall 17 by moving. The movement of the laser beam 42 is thus controlled in the manner of a pen for producing point marks 39 in the wall 17 of the preform 14.

The means for controlling the movement of the laser beam are formed by an electronic control unit 44 that is able to be parameterized at will to modify the distribution of the point marks 39 and the portions 35 of the wall 17 that is to be superheated; this is, for example, a digital control. The parameters that are to be modified relate to, for example, the coordinates of the movement of the beam 42, the speed of movement of the beam 42, etc.

As a variant, not shown, the containers are not immobilized. The laser is then controlled by taking into account the movement of the preform. In this case, the marking that is carried out is called "Cartesian," i.e., the laser carries out a scanning that is only vertical in relation to a set reference while the preform travels horizontally in relation to said set reference and, thus, the two vertical and horizontal axes are covered by the laser beam. This variant is particularly suitable for superheating small portions 35 in a relatively short time compared to the travel speed of the preforms in front of the laser.

According to another variant of the invention, not shown, a laser is combined with each slot of the wheel in such a way as to mark individually each preform that is loaded onto the associated slot. Thus, each laser accompanies the rotation of the wheel to make possible a continuous marking without slowing down the stream of preforms.

As a variant, not shown, the marking is carried out by projecting a wide laser beam through a mask or by projecting a laser beam via a means for shaping the beam, such as diffractive optics.

The portions 35 that are to be superheated can be located at any location of the preform 14.

Figure 5:
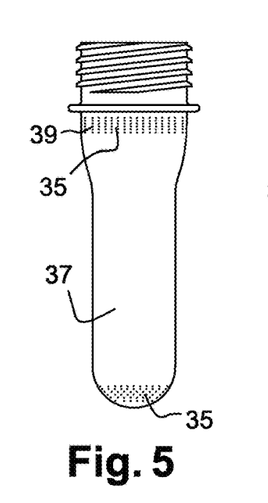
FIG. 5 is a profile view of a marked preform according to a first preferential heating profile.

Thus, according to a first example that is shown in FIG. 5, a first portion 35 that is to be superheated is formed by an upper end segment of the body that is arranged directly below the neck 18. It is actually known that this area is difficult to heat because of its proximity with the neck 18, which is to remain at a temperature that is lower than the glass transition temperature so as not to deform the area under the neck 18.

The preform 14 also has a second portion 35 that is to be superheated and that is formed by the bottom 19 of the preform. It is actually common that this preform portion is difficult to heat correctly because of the hemispherical shape of the bottom 19 that is less well exposed to the heating radiation than the rest of the cylindrical body 16 of the preform.

Figure 6:
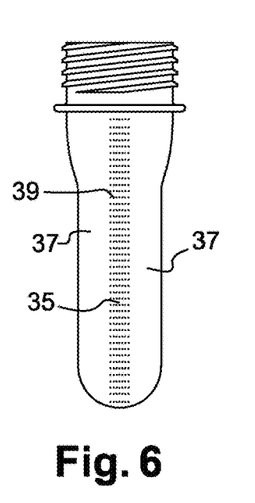
FIG. 6 is a profile view of a marked preform according to a second preferential heating profile.

According to a second example that is shown in FIG. 6, the preform 14 has a portion 35 that is to be superheated that extends over an axial strip of the body 16 of the preform 14. Here, this is a preform 14 that is designed to be shaped into a non-axisymmetrical container.

Of course, it is possible to distribute freely the portions 35 that are to be superheated in a manner that is suited to each situation.

The density of the point marks 39 on each elementary part of the portion 35 that is to be superheated is determined based on the heating temperature that it is desired to reach on said elementary part. The higher the density of the point marks 39 is on a determined area of wall 17, the higher the absorption coefficient of the heating radiation will be. When the body 16 of the preform 14 is subjected to the heating radiation, the temperature of said area of wall 17 will therefore increase more quickly than the areas of wall 17 that have a lower, and even zero, marking density.

In the examples that are shown in FIGS. 5 and 6, the density of point marks 39 is homogeneous over the entire portion 35 that is to be superheated.

As a variant, the density of point marks 39 is able to vary according to a distribution that is determined over the entire expanse of the portion 35 that is to be superheated. This is the case in particular when it is desired that the temperature of the portion 35 that is to be superheated is not homogeneous.

Each point mark 39 is formed individually by the laser beam 42. As a result, the point marks 39 are able to be distributed according to organized patterns.

Figure 7:
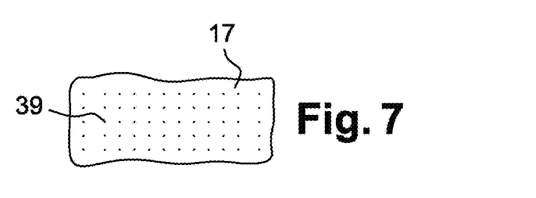
FIG. 7 is a developed view of a marked portion of the wall of a preform viewed orthogonally to the outer face of said wall, with the marks being distributed according to a first organized pattern.

Thus, FIG. 7 shows a development of the wall 17 viewed orthogonally to the outer face 21. The point marks 39 are distributed here in a matrix pattern in which the point marks 39 are distributed by horizontal rows and by vertical columns.

Figure 8:
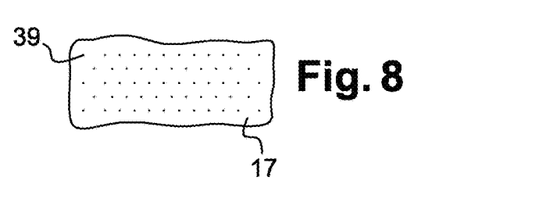
FIG. 8 is a view that is similar to that of FIG. 7, which shows the organized marks according to a second organized pattern.

According to a second pattern example that is shown in FIG. 8, the point marks 39 are distributed in staggered rows.

Figure 9:
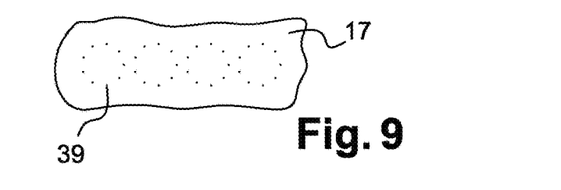
FIG. 9 is a view that is similar to that of FIG. 7, which shows the organized marks according to a third organized pattern.

According to a third pattern example that is shown in FIG. 9, the point marks 39 are distributed according to a string of geometric shapes. The point marks 39 are distributed here on perimeters of successive circles.

Figure 10:
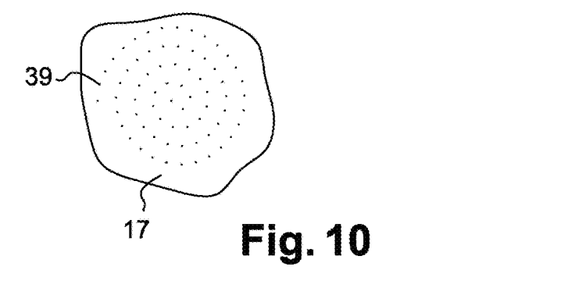
FIG. 10 is a view that is similar to that of FIG. 7, which shows the organized marks according to a fourth organized pattern.

According to a fourth pattern example that is shown in FIG. 10, the point marks 39 are distributed in concentric geometric shapes, here, circles.

Of course, other organized pattern distributions are possible.

As a variant, not shown, it will be possible, of course, to distribute the point marks according to a pattern that artificially reproduces a random distribution.

The facility 10 that is thus described is implemented by a method for preferential heating of a hollow body that is made of thermoplastic material, such as a preform 14.

The preform 14 is designed to be heated according to a preferential heating profile. Thus, at least one portion 37 that is to be heated of the body 16 of the preform 14 is designed to be heated to a first heating temperature that exceeds the glass transition temperature. At least one other portion 35 that is to be superheated of the body 16 of the preform 14 is designed to be heated beyond the first heating temperature. Initially, the body 16 of the preform has a homogeneous absorption coefficient. In other words, the portion 35 that is to be superheated initially has an absorption coefficient of the heating radiation that is approximately equal to the absorption coefficient of the portion 37 that is to be heated.

Figure 11:
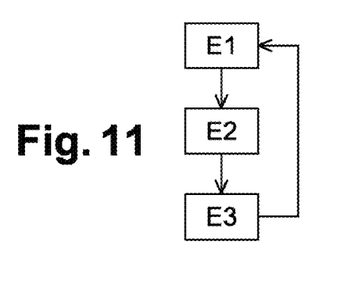
FIG. 11 is a block diagram that shows the various steps of the preferential heating method that is carried out according to the teachings of the invention.

With reference to FIG. 1, the method comprises a first step "E1" for marking portions 35 that are to be superheated of the preform 14 during which point marks 39 are made in the thickness of the wall 17 of the portion 35 that is to be superheated, excluding faces that delimit the wall, in such a way as to increase the absorption coefficient of said portion 35 that is to be superheated in relation to the absorption coefficient of the portion 37 that is to be heated.

The outer face 21 and the inner face 23 of the portions 35 that are to be superheated of the body 16 of the thus marked preform 14 have a surface state that is essentially identical to that of the outer face 21 and the inner face 23 of the portions 37 that are to be heated.

The method then comprises a second step "E2" for heating the marked preform 14 beyond a glass transition temperature. For this purpose, the marked preform 14 is inserted into the heating station 20. The body 16 of the preform 14 is uniformly exposed to the heating radiation. Thus, the portions 35 that are to be superheated are exposed to the same amount of heating radiation as the portions 37 that are to be heated. Because of the presence of point marks 39 in a set density, the temperature of the portions 35 that are to be superheated rises more quickly than the temperature of the portions 37 that are to be heated. At the exit of the heating station 20, the body 16 of the preform 14 is thus heated in a heterogeneous manner according to a determined heating profile, despite the uniform circumferential exposure of the body 16 to the heating radiation.

As a variant, it is expected that the heating step is a preferential heating step that gives priority to the heating of the areas that are to be superheated. The marking then makes it possible to magnify the preferential heating effect.

In another variant that can be applied to the manufacturing of non-axisymmetrical containers (flasks, for example), it is expected that the marking is applied to areas that are difficult to treat with traditional preferential heating, such as the one described in FR-A1-2,703,944, in particular the area under the neck or the bottom area, and other areas of the body are subjected to a traditional preferential heating step.

Optionally, the method for preferential heating of the body 16 of the preform 14 comprises a third step "E3," for controlling the marking means, which takes place at the exit of the heating station 20. During this third control step "E3," the temperature of the portion 35 that is to be superheated is determined, for example by means of a contactless temperature sensor 46 that is arranged at the exit of the heating station 20. The temperature that is measured by the sensor 46 is then transmitted to an electronic control unit 44 that compares it to a setpoint temperature. If the measured temperature differs from the setpoint temperature, the electronic control unit 44 sends the command to the laser 40 to modify the density of the point marks 39 in the first marking step "E1" in such a way as to approach the setpoint temperature for the next preforms 14.

The thus heated preform 14 is then sent to the forming station 24 to be shaped into a container. In general, the point marks 39 are visible to the naked eye on the preforms 14 after their marking. By contrast, these point marks 39 become almost imperceptible to the naked eye after the forming operation. The stretching that the wall 17 undergoes actually decreases the surface density of the point marks 39.

In addition, with the point marks 39 being formed in the body by heating the thermoplastic material, they are stretched at the same time as the wall 17, making their appearance less opaque.

The preferential heating method that is carried out according to the teachings of the invention makes it possible to increase easily the absorption coefficient of certain wall portions of a standard preform. Thus, it is no longer necessary to provide for the manufacture of preforms that are limited to a particular application starting at the molding operation of the preform.

In addition, the marking device makes it possible to modify easily the configuration of preform portions that are to be superheated, for example when the container manufacturer desires to change the shape of the containers that are to be formed.

In addition, it is particularly easy to control the marking station based on the temperature that is measured on the preforms 14 that exit from the heating station 20. This makes it possible to limit the number of preforms that are to be rejected in the case of non-conformity.

The invention claimed is:

1. Method for preferential heating of a hollow body that is made of thermoplastic material, namely a container preform (14), with the method comprising a step (E2) for heating the hollow body beyond a glass transition temperature by a heating radiation, at least one portion (37) that is to be heated of the hollow body being designed to be heated to a first heating temperature while at least one other portion (35) that is to be superheated of the hollow body is designed to be heated beyond the first heating temperature, with the portion (35) that is to be superheated initially having an absorption coefficient of the radiation that is essentially identical to that of the portion (37) that is to be heated;

the method comprising in succession:
A first step (E1), for marking at least one portion (35) that is to be superheated of the hollow body, during which point marks (39) are made in the thickness of the wall (17) of said portion (35) that is to be superheated in such a way as to increase the absorption coefficient of said portion (35) that is to be superheated in relation to the absorption coefficient of the portion (37) that is to be heated;
A second step (E2), for heating the hollow body, during which each portion (37) that is to be heated and each portion (35) that is to be superheated are exposed to the heating electromagnetic radiation.

2. Method according to claim 1, wherein during the first marking step (E1), point marks (39) are made in the thickness of the wall (17) of at least one portion (35) that is to be superheated, excluding faces (21, 23) that delimit the wall (17).

3. Method according to claim 1, wherein during the second heating step (E2), said at least one portion (37) that is to be heated and said at least one portion (35) that is to be superheated are uniformly exposed to the heating electromagnetic radiation.

4. Method according to claim 1, wherein the density of point marks (39) on each elementary part of a portion (35) that is to be superheated is determined based on the heating temperature that is to be reached at the end of the second heating step (E2) for said elementary part.

5. Method according to claim 4, wherein each point mark (39) is made by point modification of the opacity with respect to the radiation of the material that constitutes the wall (17) that is made of thermoplastic material of the hollow body.

6. Method according to claim 5, wherein each point mark (39) is made by means of a laser (40) that emits a laser beam (42).

7. Method according to claim 6, wherein each point mark (39) is made by local heating of the material in the thickness of the wall (17) by means of the laser (40).

8. Method according to claim 7, wherein the thermoplastic material is formed by "PET," and wherein the laser beam (42) has a wavelength of between 400 nm and 3,000 nm.

9. Method according to claim 8, wherein the laser beam (42) has a wavelength in the short infrared of 1,064 nm.

10. Method according to claim 6, wherein the laser (40) emits a laser beam (42) in pulses of between $10^{-10}$ and $10^{-7}$ seconds.

11. Method according to claim 6, wherein the laser (40) is adjusted so that a focal point of the laser beam (42) that is emitted is arranged at a distance from the faces (21, 23) that delimit the wall (17) to be marked that exceeds a determined threshold, below which the face (21, 23) of the wall is damaged.

12. Method according to claim 11, wherein the focal point of the laser beam (42) is located in the thickness of the wall (17) to be marked.

13. Method according to claim 10, wherein the focal point of the laser beam (42) is located outside of the wall (17) to be marked.

14. Method according to claim 4, further comprising a third step (E3) for controlling the marking means during which the temperature of at least one portion (35) that is to be superheated is determined, and then it is compared to a setpoint temperature, with the density of the point marks (39) being modified in the first marking step (E1) in such a way as to approach the setpoint temperature for the next preforms (14).

15. Marked preform (14) that is obtained at the end of the first step of the method that is carried out according to claim 1, with the preform (14) being made by molding a single thermoplastic material, wherein the wall (17) of the preform (14) comprises at least one portion (35) that is to be superheated comprising, in the thickness of the wall (17) made of thermoplastic material, point marks (39) formed by local opacification of the thermoplastic material.

16. Preform (14) according to claim 15, wherein the point marks (39) are distributed in at least one portion (35) that is to be superheated according to organized patterns.

17. Preform (14) according to claim 16, wherein at least one portion (35) of the wall that is to be superheated has a surface state that is similar to the other portions (37) of the wall that is to be heated.

18. Preform (14) according to claim 15, wherein the preform is made of polyethylene terephthalate.

19. Method according to claim 2, wherein during the second heating step (E2), said at least one portion (37) that is to be heated and said at least one portion (35) that is to be superheated are uniformly exposed to the heating electromagnetic radiation.

20. Method according to claim 2, wherein the density of point marks (39) on each elementary part of a portion (35) that is to be superheated is determined based on the heating temperature that is to be reached at the end of the second heating step (E2) for said elementary part.

\* \* \* \* \*